(12) United States Patent
Narumi et al.

(10) Patent No.: US 8,385,161 B2
(45) Date of Patent: Feb. 26, 2013

(54) OPTICAL INFORMATION REPRODUCING DEVICE, OPTICAL INFORMATION REPRODUCING METHOD AND INTEGRATED CIRCUIT

(75) Inventors: Kenji Narumi, Osaka (JP); Masahiro Birukawa, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/148,756

(22) PCT Filed: Jan. 29, 2010

(86) PCT No.: PCT/JP2010/000529
§ 371 (c)(1),
(2), (4) Date: Aug. 10, 2011

(87) PCT Pub. No.: WO2010/092761
PCT Pub. Date: Aug. 19, 2010

(65) Prior Publication Data
US 2011/0310719 A1    Dec. 22, 2011

(30) Foreign Application Priority Data
Feb. 12, 2009   (JP) .................................. 2009-029431

(51) Int. Cl.
*G11B 11/00* (2006.01)
*G11B 20/18* (2006.01)
(52) U.S. Cl. .................................. 369/13.33; 369/53.31
(58) Field of Classification Search ......................... None
See application file for complete search history.

(56) References Cited

U.S. PATENT DOCUMENTS

| | | | |
|---|---|---|---|
| 7,106,683 | B2 | 9/2006 | Saito et al. |
| 7,440,383 | B2 | 10/2008 | Saito et al. |
| 7,948,835 | B2 | 5/2011 | Futakuchi et al. |

(Continued)

FOREIGN PATENT DOCUMENTS

| | | |
|---|---|---|
| JP | 10-172172 | 6/1998 |
| JP | 2006-302428 | 11/2006 |

(Continued)

OTHER PUBLICATIONS

International Search Report issued Apr. 6, 2010 in International (PCT) Application No. PCT/JP2010/000529.

*Primary Examiner* — Joseph Haley
*Assistant Examiner* — Carl Adams
(74) *Attorney, Agent, or Firm* — Wenderoth, Lind & Ponack, L.L.P.

(57) ABSTRACT

An optical information reproducing device includes a light focusing unit for generating near-field light, a signal quality measuring circuit for measuring reproduction signal quality of the optical information recording medium using the near-field light generated by the light focusing unit, a gap length determining circuit for determining a gap length between the light focusing unit and a surface of the optical information recording medium as a set value based on a measurement result on the reproduction signal quality in the signal quality measuring circuit, and a gap control circuit for controlling a gap between the light focusing unit and the surface of the optical information recording medium based on the set value determined in the gap length determining circuit. Information is reproduced from the optical information recording medium using the near-field light generated by the light focusing unit.

11 Claims, 4 Drawing Sheets

U.S. PATENT DOCUMENTS

| | | |
|---|---|---|
| 2004/0013077 A1 | 1/2004 | Saito et al. |
| 2005/0243690 A1* | 11/2005 | Lee et al. .................. 369/275.3 |
| 2006/0274610 A1 | 12/2006 | Saito et al. |
| 2009/0129240 A1* | 5/2009 | Futakuchi et al. ....... 369/112.23 |
| 2009/0290456 A1 | 11/2009 | Futakuchi et al. |
| 2010/0110866 A1* | 5/2010 | Takeshita et al. ............. 369/116 |

FOREIGN PATENT DOCUMENTS

| | | |
|---|---|---|
| JP | 2008-146739 | 6/2008 |
| JP | 2010-3399 | 1/2010 |
| WO | 03/021583 | 3/2003 |

* cited by examiner

OPTICAL INFORMATION REPRODUCING DEVICE, OPTICAL INFORMATION REPRODUCING METHOD AND INTEGRATED CIRCUIT

BACKGROUND OF THE INVENTION

Technical Field

The present invention relates to an optical information reproducing device and an optical information reproducing method for optically reproducing information from an optical information recording medium and an integrated circuit used in the device and, particularly to a control of an optical information reproducing device using near-field light.

BACKGROUND ART

A technology using near-field light has been proposed as a method capable of recording data at a high density and reproducing them on and from an optical disc as an optical information recording medium.

What has been focused as a notable light focusing means for generating near-field light in recent years is an optical system which is a combination of a condenser lens and a solid immersion lens (hereinafter, referred to as SIL). By this combination, a NA (numerical aperture) higher than the numerical aperture of the condenser lens can be realized. Since the size of a spot can be made smaller by increasing the numerical aperture of the optical system, recording can be performed at a higher density.

In an optical system using an SIL, a distance between the SIL and a surface of an optical disc is required to be very short. In an optical system for DVDs and the like, a distance between an objective lens and a surface of an optical disc is about 1 mm. However, in the case of an SIL, a distance between an exit surface of the SIL and a surface of an optical disc needs to be 100 nm or shorter. If the distance between the exit surface of the SIL and the surface of the optical disc varies, near-field light may not be obtained or the SIL may crash with the optical disc (i.e. possibility of a crash). Therefore, a control for keeping the distance between the exit surface of the SIL and the surface of the optical disc constant is necessary.

To realize such a control, a method called gap servo has been proposed. This method is disclosed, for example, in patent literature 1. In this method, the light quantity of a specific polarization component of reflected light from an optical disc based on near-field light is detected, and the positions of a condenser lens and an SIL in an optical axis direction are so actively adjusted by an actuator that the detected light quantity has a constant value. In this way, a distance (i.e. gap) between an exit surface of the SIL and a surface of the optical disc is controlled (this disclosure is called a prior art below).

However, the technology disclosed in the above prior art has a problem caused by leaving the following points out of consideration.

Firstly, whether reproduction characteristics of an optical disc are good or poor and the probability of a crash sensitively depend on the length of the gap (hereinafter, referred to as gap length). If the gap length is set to be short, a ratio of light incident on the optical disc to light exiting from the SIL (i.e. coupling efficiency) becomes higher. As a result, an SNR (signal-to-noise-ratio) ratio of a reproduction signal from the optical disc becomes higher to improve reproduction signal quality.

On the other hand, if the gap length becomes shorter, a probability that the SIL crashes with the optical disc increases when there is a fluctuation in the surface shape of the optical disc or when surface fluctuation occurs during the rotation of the optical disc. Thus, the prior art has a problem that the reproduction signal quality cannot be improved while the probability of a crash is decreased.

Secondly, there is an individual difference in the surface shape of the optical disc and optical characteristics of recording pits (or recording marks). Thus, if an equal gap length is set for all optical discs, there is a problem that the probability of a crash increases or the reproduction signal quality is insufficient depending on the optical discs.

CITATION LIST

Patent Literature

Patent Literature 1: Pamphlet of International Publication No. 03/021583

SUMMARY OF THE INVENTION

In order to solve the above conventional problems, an object of the present invention is to provide an optical information reproducing device, an optical information reproducing method and an integrated circuit which can improve reproduction signal quality while reducing the probability of a crash even when there is an individual difference in the surface shape and optical characteristics of an optical information recording medium.

One aspect of the present invention is directed to an optical information reproducing device for reproducing information from an optical information recording medium, comprising a light focusing unit for generating near-field light; a measuring unit for measuring reproduction signal quality of the optical information recording medium using the near-field light generated by the light focusing unit; a gap length determining unit for determining a gap length between the light focusing unit and a surface of the optical information recording medium as a set value based on a measurement result on the reproduction signal quality in the measuring unit; and a gap control unit for controlling a gap between the light focusing unit and the surface of the optical information recording medium based on the set value determined in the gap length determining unit.

According to the above optical information reproducing device, even if there is an individual difference in the surface shape and optical characteristics of an optical information recording medium, the reproduction signal quality can be improved while the probability of a crash is reduced.

DESCRIPTION OF THE INVENTION

Hereinafter, the present invention is more specifically described by way of an embodiment.
(Construction of One Embodiment)

First, the construction of an optical information reproducing device according to one embodiment of the present invention is described with reference to FIG. 1. In the following description, an optical information recording medium is a recordable or rewritable medium and an exemplary case where the optical information reproducing device optically records and reproduces information is described. Note that the optical information reproducing device to which the present invention is applied is not particularly limited to this example and may be an optical information reproducing device which only optically reproduces information.

Figure 1:
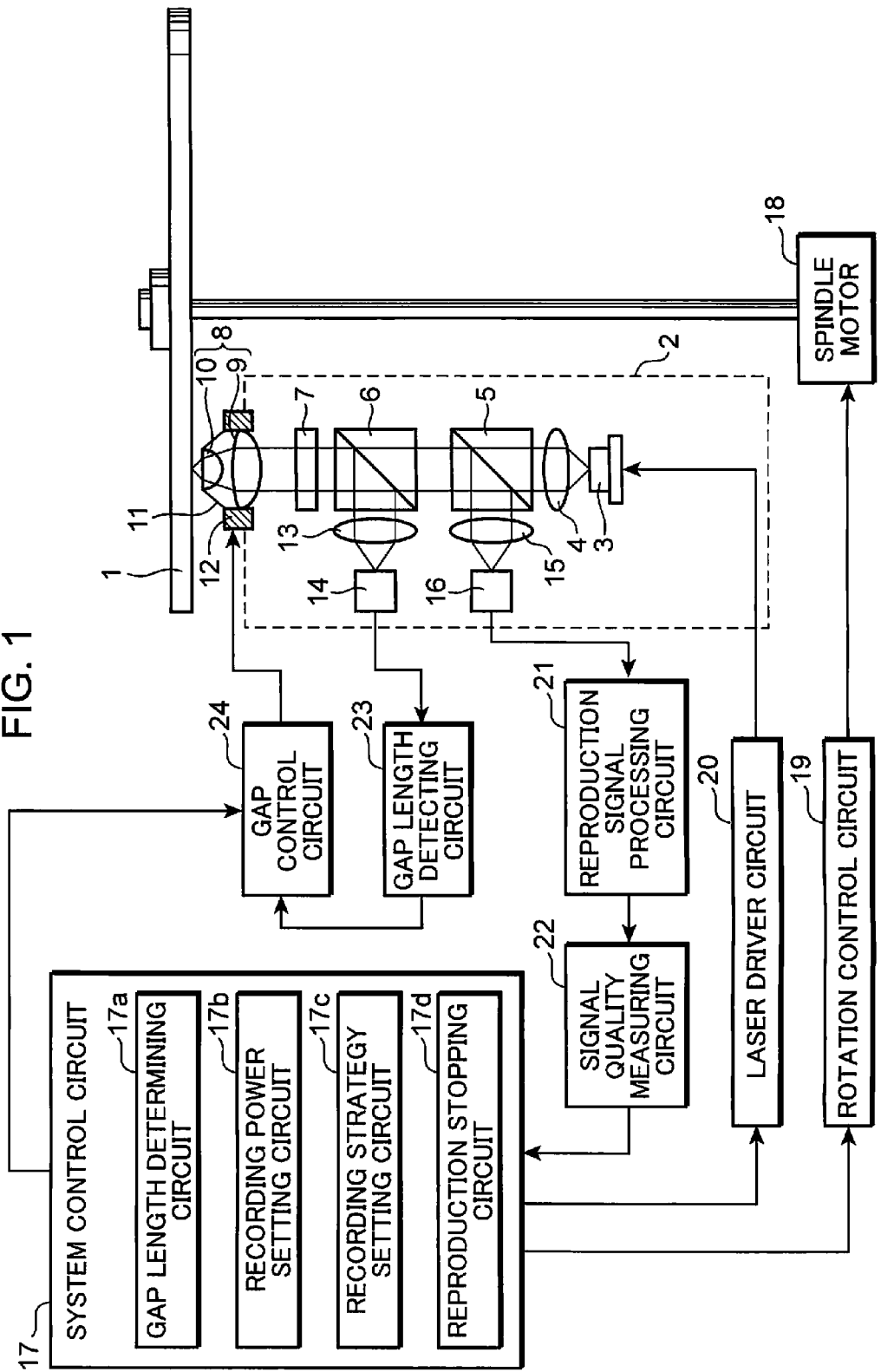
FIG. 1 is a block diagram showing the construction of an optical information reproducing device according to one embodiment of the invention.

The optical information reproducing device shown in FIG. 1 includes an optical head 2, a system control circuit 17, a spindle motor 18, a rotation control circuit 19, a laser driver circuit 20, a reproduction signal processing circuit 21, a signal quality measuring circuit 22, a gap length detecting circuit 23 and a gap control circuit 24. The optical head 2 includes a laser 3, a collimator lens 4, a polarizing beam splitter 5, a beam splitter 6, a quarter-wave plate 7, a light focusing unit 8, detection lenses 13, 15 and detectors 14, 16.

In FIG. 1, denoted by 1 is an optical disc which is an optical information recording medium, and the optical head includes an outward path optical system made up of the following members. The laser 3 is a light source for laser light. The collimator lens 4 converts emitted laser light into parallel light. The polarizing beam splitter 5 transmits the laser light from the collimator lens 4 and splits reflected light from the optical disc 1. The beam splitter 6 transmits the laser light from the polarizing beam splitter 5 and splits return light from an area where near-field light is generated. The quarter-wave plate 7 converts linearly polarized light into circularly polarized light.

The light focusing unit 8 is a member for generating near-field light and composed of two lenses, i.e. a condenser lens 9 and an SIL 10. A semisphere lens is, for example, used as the SIL 10 and a flat surface side thereof is right opposite to a surface of the optical disc 1. The condenser lens 9 and the SIL 10 are integrally fixed by a lens holder 11, and an actuator 12 is mounted on the lens holder 11. This actuator 12 moves the condenser lens 9 and the SIL 10 in an optical axis direction, whereby a gap between the surface of the optical disc 1 and an exit surface of the SIL 10 can be adjusted.

Next, a return path optical system from the optical disc 1 to the detectors 14, 16 is described.

Light on a return path reflected by the beam splitter 6 is condensed by the detection lens 13 and incident on the detector 14. The quantity of the light incident on this detector 14 corresponds to the quantity of the return light from the area where the near-field light is generated. This light quantity varies according to a gap length between the SIL 10 and the surface of the disc 1.

Specifically, when the SIL 10 and the surface of the optical disc 1 are perfectly in contact, transmission of the outward light from the SIL 10 to the optical disc 1 is maximized. Thus, the quantity of the return light is minimized. On the other hand, when the SIL 10 and the surface of the optical disc 1 are sufficiently distant, no near-field light is generated. Thus, light in an annular part of the light incident on the SIL 10 is totally reflected and the quantity of the return light is maximized.

In an intermediate case between the above two cases, the quantity of the return light changes substantially in proportion to the distance between the SIL 10 and the optical disc 1. Accordingly, in a state where the near-field light is generated by the SIL 10, the distance between the SIL 10 and the surface of the optical disc 1 can be detected by detecting the quantity of the light incident on the detector 14.

The light on the return path reflected by the polarizing beam splitter 5 is condensed by the detection lens 15 and incident on the detector 16. The quantity of the light incident on this detector 16 corresponds to the quantity of the reflected light from the optical disc 1.

Next, electrical and control systems of the optical information reproducing device shown in FIG. 1 are described.

The system control circuit 17 is a circuit for controlling the entire recording/reproducing device in this embodiment. The system control circuit 17 includes a gap length determining circuit 17a, a recording power setting circuit 17b, a recording strategy setting circuit 17c, a reproduction stopping circuit 17d and other control circuits (not shown).

The spindle motor 18 is a motor for rotating the optical disc 1 and is rotated and stopped and has its rotating speed controlled by the rotation control circuit 19 under the control of the system control circuit 17.

The laser driver circuit 20 controls laser irradiation/no irradiation from the laser 3 and power during irradiation. When the optical disc 1 is a recordable or rewritable optical information medium, the laser driver circuit 20 is controlled by the system control circuit 17 to record a test signal on the optical disc 1 with predetermined recording power and recording strategy.

The recording power setting circuit 17b sets the recording power of the laser driver circuit 20 at an optimal value as a target value after the gap control circuit 24 controls the gap. The recording strategy setting circuit 17c sets the recording strategy of the laser driver circuit 20 at an optimal value as a target value after the gap control circuit 24 controls the gap. Note that the recording power setting circuit 17b, the recording strategy setting circuit 17c and the reproduction stopping circuit 17d may be omitted if necessary.

The reproduction signal processing circuit 21 is a circuit for generating a reproduction signal by converting the quantity of the light received by the detector 16 into an electrical signal (voltage value) and performing waveform equalization and binarizing process so that information recorded on the optical disc 1 can be decoded. The signal quality measuring circuit 22 is a circuit for measuring the quality (e.g. jitter, error rate) of the reproduction signal.

The gap length determining circuit 17a determines the gap length between the light focusing unit 8 and the surface of the optical disc 1 as a set value based on a measurement result on the reproduction signal quality in the signal quality measuring circuit 22.

The gap length detecting circuit 23 is a circuit for converting the quantity of the light received by the detector 14 into an electrical signal (voltage value). The gap control circuit 24 is a circuit which is controlled by the system control circuit 17 and performs a servo control to keep the gap length between the SIL 10 and the surface of the optical disc 1 at a constant value by changing a drive current of the actuator 12 such that the electrical signal from the gap length detecting circuit 23 has a constant value.

The reproduction stopping circuit 17d stops reproduction from the optical disc 1 when a measurement value of the reproduction signal quality by the signal quality measuring circuit 22 does not satisfy a predetermined quality condition even if the gap length between the light focusing unit 8 and the surface of the optical disc 1 is shortened to a predetermined length.

Note that FIG. 1 shows only a construction necessary to describe the operation of the embodiment and a circuit for controlling a tracking servo, a circuit for generating the waveform of a recording pulse and other circuits are not shown. In an actual reproducing device, these circuits are added if necessary.

The signal quality measuring circuit 22, the gap length determining circuit 17a and the gap control circuit 24 can be formed by a semiconductor integrated circuit and, if necessary, the recording power setting circuit 17b, the recording strategy setting circuit 17c, the reproduction stopping circuit 17d and other circuits may also be formed as parts of the integrated circuit. Further, the system control circuit 17 may perform functions of the gap length determining circuit 17a, the recording power setting circuit 17b, the recording strategy setting circuit 17c, the reproduction stopping circuit 17d and other circuits by executing a predetermined program by a CPU (Central Processing Unit).

(Operation of the Embodiment)

Next, the operation of the optical information reproducing device of this embodiment is described with reference to a block diagram of FIG. 1 and a flow chart of FIG. 2.

Figure 2:
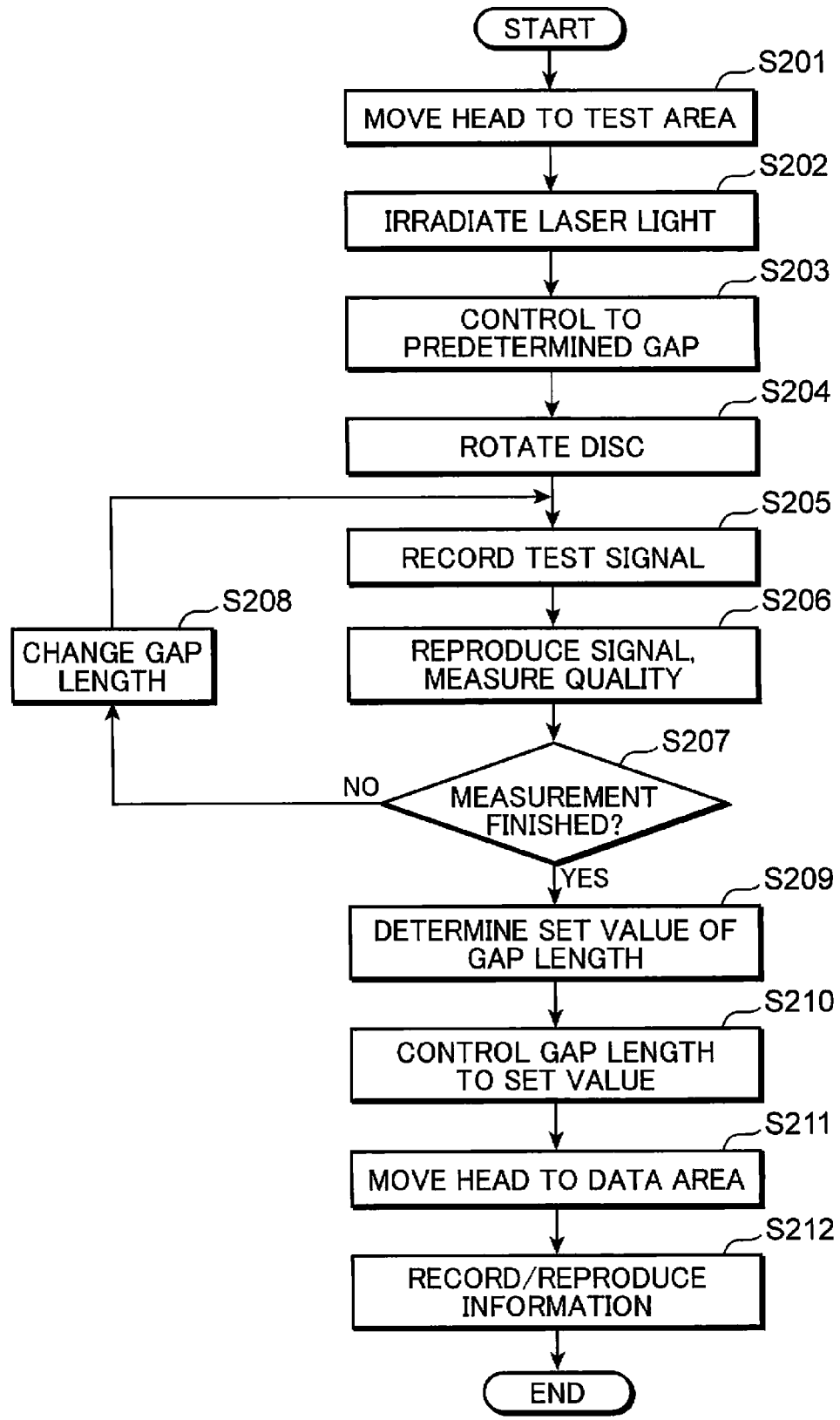
FIG. 2 is a flow chart showing the operation of the optical information reproducing device according to the embodiment.

A state of "START" in the flow chart of FIG. 2 is, for example, a state immediately after the optical information reproducing device is started, a state immediately after the optical information reproducing device returns from a standby (waiting) state, a state immediately after the optical disc 1 is inserted (i.e. loaded) into the optical information reproducing device, a state immediately after the optical information reproducing device removes foreign matters adhering to the surface of the optical disc 1 prior to recording/reproduction of information, or a like state.

After the start, in a head moving step 201 (hereinafter, abbreviated to S201), the system control circuit 17 moves the optical head 2 to a radial position where a test area of the optical disc 1 is present using a predetermined feed motor and a predetermined actuator (not shown).

Here, various areas on the optical disc 1 can be used as the test area. For example, if the optical disc 1 is a rewritable disc similar to a BD (Blu-ray Disc), an area adjacent to a management area on the inner and/or outer circumference may be used as the test area. If the optical disc 1 is a read-only disc, a data area may be used as the test area. To measure the reproduction signal quality with higher accuracy, it is preferable to provide the test area at an inner circumferential side close to the innermost track of the optical disc 1, e.g. at an innermost track position or in an area proximate thereto. This is because the outer circumference is generally more subject to disturbances such as surface fluctuation in optical discs.

Subsequently, in an irradiating step S202, the system control circuit 17 sends a signal to the laser driver circuit 20 to start light emission of the laser 3 at a value of laser power at the time of reproduction (this is referred to as reproduction power). The laser driver circuit 20 causes the laser 3 to emit light with the reproduction power in accordance with this signal.

Subsequently, in a gap length temporary controlling step S203, the gap length determining circuit 17a of the system control circuit 17 sets such that the gap control circuit 24 controls the gap between the light focusing unit 8 (i.e. SIL 10) and the surface of the optical disc 1 to be a predetermined distance at which recording and/or reproduction by the near-field light is possible. If the SIL 10 and the surface of the optical disc 1 are sufficiently distant, the gap control circuit 24 causes the light focusing unit 8 to move toward the surface of the optical disc 1 and executes a control to keep the distance constant when a predetermined distance is reached. Conversely, if the gap between the SIL 10 and the surface of the optical disc 1 is shorter than the predetermined distance (or if the SIL 10 and the surface of the optical disc 1 are in contact), the gap control circuit 24 causes the light focusing unit 8 to move away from the surface of the optical disc 1 and executes a control to keep the distance constant when the predetermined distance is reached.

As described above, the distance between the SIL 10 and the surface of the optical disc 1 can be detected by detecting the quantity of the light incident on the detector 14. The gap length detecting circuit 23 converts the quantity of the light incident on the detector 14 into an electrical signal. The gap control circuit 24 controls the gap based on the electrical signal from this gap length detecting circuit 23. In other words, the gap is controlled using a detection signal based on an optical means which is the quantity of the light incident on the detector 14 (i.e. return light).

For example, the gap control circuit 24 preferably sets a distance, at which the quantity of the return light starts decreasing, as the above predetermined distance by successively moving the SIL 10 toward the optical disc 1 from a state where the SIL 10 and the surface of the optical disc 1 are sufficiently distant in accordance with an instruction of the gap length determining circuit 17a, and controls the actuator 12 to keep this distance constant.

Subsequently, in a rotating step S204, the system control circuit 17 sends a signal to the rotation control circuit 19 to set the rotating speed of the spindle motor 18. In accordance with this signal, the rotation control circuit 19 rotates the optical disc 1 at a predetermined rotating speed.

Subsequently, in a test signal recording step S205, the recording power setting circuit 17b and/or the recording strategy setting circuit 17c of the system control circuit 17 sends a signal to the laser driver circuit 20 to drive the laser 3 with the predetermined recording power and/or recording strategy. In accordance with this signal, the laser driver circuit 20 modulates the emission light quantity of the laser 3. In this way, the test signal is recorded. After the recording of the test signal is completed, the system control circuit 17 causes the laser 3 to emit light with the reproduction power and returns the optical head 2 to a track where test recording was performed. Here, the recording power setting circuit 17b and/or the recording strategy setting circuit 17c and the laser driver circuit 20 correspond to an example of a test recording unit.

Subsequently, in a test reproducing step S206, the detector 16 detects the quantity of reflected light from the track where test recording was performed and converts it into an electrical signal, and the reproduction signal processing circuit 21 performs signal processes such as waveform equalization and binarizing process to generate a reproduction signal. The signal quality measuring circuit 22 measures the quality of the reproduction signal. Values indicating this quality include, for example, a jitter, a bit error rate, a symbol error rate, an amplitude, a modulation ratio, a resolution, a CN ratio and index values correlated to these values.

Subsequently, in an end determining step S207, the gap length determining circuit 17a of the system control circuit 17 determines whether or not test reproduction has been finished to an extent sufficient to determine a set value of the gap length. If test reproduction has not been finished, the gap length determining circuit 17a sets a gap length different from the one used for previous test recording/reproduction in a step length changing step S208 and performs S205 and S206 again.

It is preferable to perform test recording/reproduction at least twice by a loop of 5205 to S208. In other words, test recording/reproduction is preferably performed at two different gap lengths. This is because the set value of the gap length can be easily determined since a relationship between the gap length and the reproduction signal quality can be plotted as a characteristic curve (or straight line).

Subsequently, in a gap length determining step S209, the gap length determining circuit 17a of the system control circuit 17 determines a set value of the gap length optimal for the optical disc 1 based on the relationship between the gap length and the reproduction signal quality obtained as a result of test reproduction. A method for determining the set value is, for example, a method for setting a maximum gap length in a range, in which predetermined reproduction signal quality can be obtained, as the set value. This method is described with reference to FIG. 3.

Figure 3:
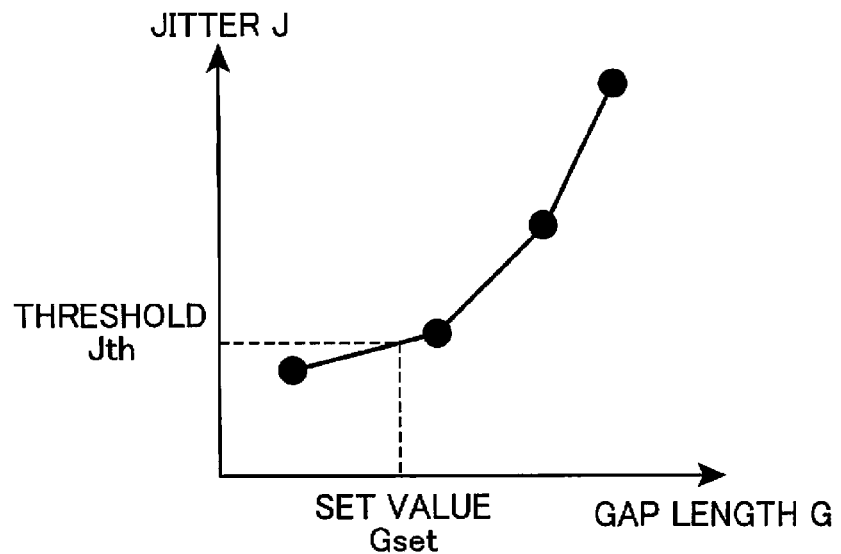
FIG. 3 is a graph showing a relationship between a gap length and a jitter and a method for calculating the gap length in the embodiment.

FIG. 3 is a graph showing a relationship between the gap length and the reproduction signal quality when test reproduction was performed at four different gap lengths and a jitter was used as a measurement value of the reproduction signal quality.

A threshold Jth of a jitter as a value indicating desired reproduction signal quality is specified beforehand, and the gap length determining circuit 17a sets a gap length Gset, at which the jitter is maximized in a range equal to or below Jth, as a set value of the gap length after the measurement of the jitter at four different gap lengths is finished. By doing so, information can be reproduced with desired reproduction signal quality while the gap length is maximized (i.e. while the probability of a crash is minimized).

Here, as the threshold Jth of the jitter, a permissible jitter value Jref may be used as it is or a value obtained by multiplying the permissible jitter value Jref by a predetermined coefficient (value equal to or below 1, e.g. 0.8) may be used to consider a predetermined margin. Further, a value obtained by multiplying the gap length, at which the jitter is maximized in the range equal to or below Jth, by a predetermined coefficient (value equal to or below 1, e.g. 0.8) may be used as the set value of the gap length.

Although the reproduction signal quality was measured at four different gap lengths in the example shown in FIG. 3, the reproduction signal quality may be measured at three, five or more different gap lengths without being particularly limited to this example.

The difference between the gap lengths may differ in various manners such as by an equal amount, by a successively increasing amount and by a successively decreasing amount. Further, various changes can be made in the gap lengths. For example, after being first measured at gap lengths differing by large amounts, the reproduction signal quality is measured at gap lengths differing by small amounts near the threshold Jth of the jitter and the gap length Gset, at which the jitter is maximized in the range equal to or below Jth, is set as the set value of the gap length based on this highly accurate measurement result.

Further, the reproduction signal quality may be successively measured at different gap lengths and, when the jitter becomes equal to or below Jth, the gap length at that time may be the set value and the measurement of the reproduction signal quality may be finished. In this case, the measurement of the reproduction signal quality can be completed in a short time.

Subsequently, in a gap controlling step S210, the gap length determining circuit 17a of the system control circuit 17 sets such that the gap control circuit 24 controls the gap between the light focusing unit 8 (i.e. SIL 10) and the surface of the optical disc 1 to have the gap length determined as the set value. The gap control circuit 24 controls the actuator 12 to keep the gap length determined as the set value in accordance with an instruction from the gap length determining circuit 17a.

Subsequently, in a seeking step S211, the system control circuit 17 moves the radial position of the optical head 2 to a radial position in the data area of the optical disc 1. This step may be performed to move to a predetermined address while address information recorded on the optical disc 1 is reproduced.

Finally, in a recording/reproducing step S212, the optical information reproducing device records/reproduces information on or from the optical disc 1.

By the above steps, an optimal gap length can be determined for the individual optical disc 1 in this embodiment. Thus, a possibility of damaging the optical disc 1 due to a crash of the SIL 10 can be reduced. Further, special effects of improving the reproduction signal quality and enabling accurate information reproduction are displayed.

Although the gap is controlled using the detection signal based on the optical means in the gap length temporary controlling step S203 and/or the gap controlling step S210 in this embodiment, the gap may be controlled by a method which does not depend on any optical means such as levitation by an airstream. However, the use of a detection signal based on the optical means is more preferable in facilitating the control since the detection signal can be directly used for the gap control.

The system control circuit 17 preferably includes the reproduction stopping circuit 17d which stops the reproduction from the optical disc 1 when the measurement value of the reproduction signal quality exceeds the predetermined value even if the gap length is shortened to a predetermined length (length at which the probability of a crash is very high). For example, in the test reproducing step S206, the reproduction stopping circuit 17d can stop the reproduction from the optical disc 1 when the measurement value of the reproduction signal quality exceeds the predetermined value even if the gap length is shortened to the predetermined length. This is more preferable since damage of the optical disc 1 by a crash can be prevented.

Although the maximum gap length in the range in which the predetermined reproduction signal quality is obtained is used as the set value in the gap length determining step S209 in this embodiment, the set value can be easily determined even when a gap length, at which a slope of a tangent to a characteristic curve representing the relationship between the gap length and the measurement value of the reproduction signal quality is a predetermined value, is the set value. This method is described with reference to FIG. 4.

Figure 4:
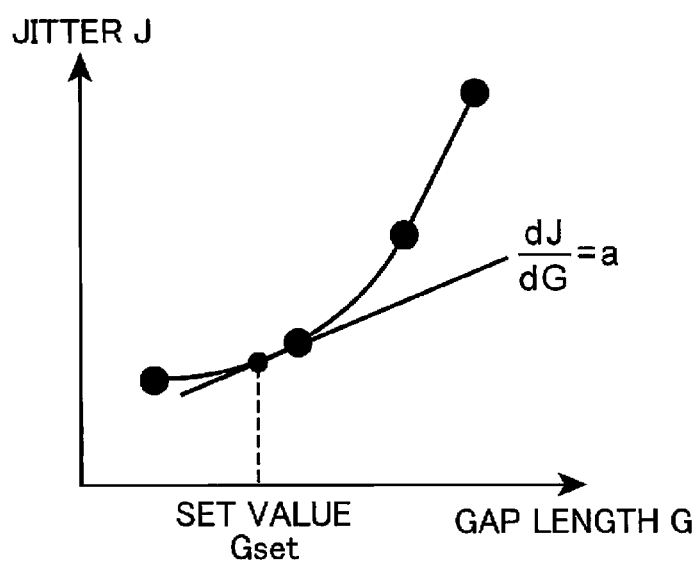
FIG. 4 is a graph showing the relationship between the gap length and the jitter and another method for calculating the gap length in the embodiment.

FIG. 4 is, similar to FIG. 3, a graph showing a relationship between the gap length and the reproduction signal quality when test reproduction was performed at four different gap lengths and a jitter was used as a measurement value of the reproduction signal quality. After the measurement of the jitter at four different gap lengths is finished, the gap length determining circuit 17a interpolates four measurement points by curves, calculates inclinations (dJ/dG) of tangents to the curves, and sets a gap length Gset, at which the inclination is maximized in a range equal to or below a predetermined value "a", as a set value of the gap length. The shorter the gap length, the smaller an improved amount of the reproduction signal quality to approach a saturated value. Thus, by doing so, information can be reproduced from the optical disc 1 with maximally high reproduction signal quality while the gap length is maximized. Note that a value obtained by multiplying the gap length, at which the inclination is maximized in the range equal to or below the predetermined value "a", by a predetermined coefficient (value equal to or below 1, e.g. 0.8) may be used as the set value of the gap length.

Although the reproduction signal quality was measured at four different gap lengths also in the example shown in FIG. 4, the reproduction signal quality may be measured at three, five or more different gap lengths without being particularly limited to this example.

The difference between the gap lengths may differ in various manners such as by an equal amount, by a successively increasing amount and by a successively decreasing amount. Further, various changes can be made in the gap lengths. For example, after interpolation curves are generated by measuring the reproduction signal quality at gap lengths differing by large amounts, interpolation curves are generated by measuring the reproduction signal quality at gap lengths differing by small amounts near the gap length at which the inclination is the predetermined value "a" and the gap length Gset, at which the inclination is maximized in the range equal to or below the predetermined value "a", is set as the set value of the gap length based on these highly accurate interpolation curves.

Further, an interpolation curve which interpolates between measurement points may be generated every time the reproduction signal quality is measured at a different gap length and, when the inclination becomes equal to or below the predetermined value "a", the gap length at that time may be set as the set value and the measurement of the reproduction signal quality may be finished. In this case, the measurement of the reproduction signal quality can be completed in a short time.

Figure 5:
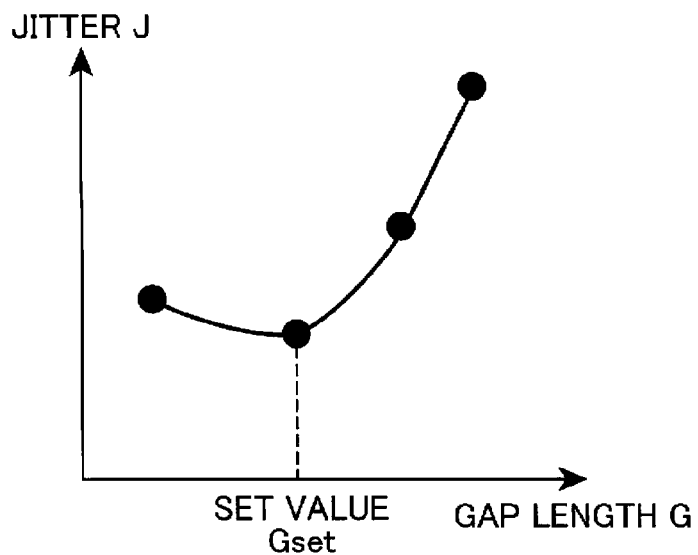
FIG. 5 is a graph showing the relationship between the gap length and the jitter and another method for calculating the gap length in the embodiment.

When a surface state of the optical disc 1 is poor or surface fluctuation or eccentricity is large, the relationship between the gap length and the jitter may have a minimum value (i.e. (dJ/dG)=0) as shown in FIG. 5. In such a case, a gap length Gset at which the jitter is minimized may be the set value. If a plurality of minimum values are present in the relationship between the gap length and the jitter, the longest gap length may be the set value.

The system control circuit 17 preferably includes the recording power setting circuit 17b which sets the recording power of the laser driver circuit 20 at an optimal value as a target value after the gap control circuit 24 controls the gap and/or the recording strategy setting circuit 17c which sets the recording strategy of the laser driver circuit 20 at an optimal value as a target value after the gap control circuit 24 controls the gap.

For example, after the gap control circuit 24 controls the gap in the gap controlling step S210, the recording power setting circuit 17b and/or the recording strategy setting circuit 17c may set the recording power and/or the recording strategy at the optimal value(s) and the laser driver circuit 20 may drive the laser 3 with the optimal recording power and/or the optimal recording strategy in the recording/reproducing step S212. In this case, the recording power and the recording strategy can be more accurately determined.

After the recording power and/or the recording strategy are set at the optimal value(s), the test signal recording step S205 to the gap length determining step S209 may be performed again. In this case, the reproduction signal quality can be more accurately measured by reproducing the test signal recorded with the optimal recording power and/or recording strategy.

Although the optical information recording medium is of the recordable type or the rewritable type in this embodiment, it may be of the read-only type. In this case, the test signal recording step S205 can be omitted and the reproduction signal quality can be measured by reproducing the test signal recorded in the test area beforehand. Alternatively, the reproduction signal quality may be measured by reproducing information recorded in the data area beforehand. In this case, the head moving step S201 can be omitted. Further, information recording in the recording/reproducing step S212 is also unnecessary.

In this embodiment, the light focusing unit 8 used includes the SIL 10. This is because of an advantage that a very small spot can be obtained and high-density recording and/or reproduction can be performed by increasing the NA. This light focusing unit may be another means (e.g. optical fiber probe) a surface of which is moved to a distance of several nm to several 100 nm from the surface of the optical disc 1 and which records and/or reproduces information using near-field light.

EXAMPLE

The effects of the embodiment of the present invention are described below based on more specific experiment results.

A polycarbonate substrate formed with a spiral track (groove) was used as a substrate of the optical disc 1. A groove pitch was 250 nm and a groove depth was 20 nm. A thin film layer including a rewritable phase-change recording layer was formed on this substrate by sputtering. This thin film layer had such a four-layer structure that an Ag alloy layer, a $ZnS$—$SiO_2$ dielectric layer, a GeSbTe phase-change recording layer and a $ZnS$—$SiO_2$ dielectric layer were successively laminated in this order on the substrate. By such a production method, two discs A and B were prepared which included phase-change recording layers having different film thicknesses. The film thicknesses of the respective layers are as shown in Table-1.

TABLE 1

|  | Disc A | Disc B |
|---|---|---|
| Ag Alloy | 100 nm | 100 nm |
| $ZnS$—$SiO_2$ | 30 nm | 30 nm |
| GeSbTe | 10 nm | 15 nm |
| $ZnS$—$SiO_2$ | 70 nm | 70 nm |

On the other hand, an oscillation wavelength of the laser 3 was 405 nm. A semisphere lens was used as the lens of the SIL 10. An NA by the condenser lens 9 and the SIL 10 was 1.84.

The actuator 12, the spindle motor 18, the rotation control circuit 19, the laser driver circuit 20 and the reproduction signal processing circuit 21 used were those of an optical disc evaluator using far-field light (i.e. not using near-field light). The gap length detecting circuit 23 and the gap control circuit 24 were fabricated based on the method described in the above embodiment. A time interval analyzer, which is a measuring device, was used as the signal quality measuring circuit 22.

Although not shown in FIG. 1, an optical system and a circuit for controlling a tracking servo, an optical system and a circuit for reproducing information and a circuit for generating the waveform of a recording pulse are also used in this example. These were also those of the optical disc evaluator using far-field light.

A gap servo is performed with the gap length set at four values of 20 nm, 30 nm, 40 nm and 50 nm and a jitter of a reproduction signal was measured by recording and reproducing a random signal for each of the discs A and B produced as described above. Here, a linear velocity at the time of recording and reproduction was 2.5 m/s and a channel clock cycle Tw was 15 ns. A recording power of the laser 3 was 5.0 mW, an erasure power (bias power) was 2.0 mW and a reproduction power was 0.2 mW. Further, a threshold Jth of a permissible jitter was 10%.

Figure 6:
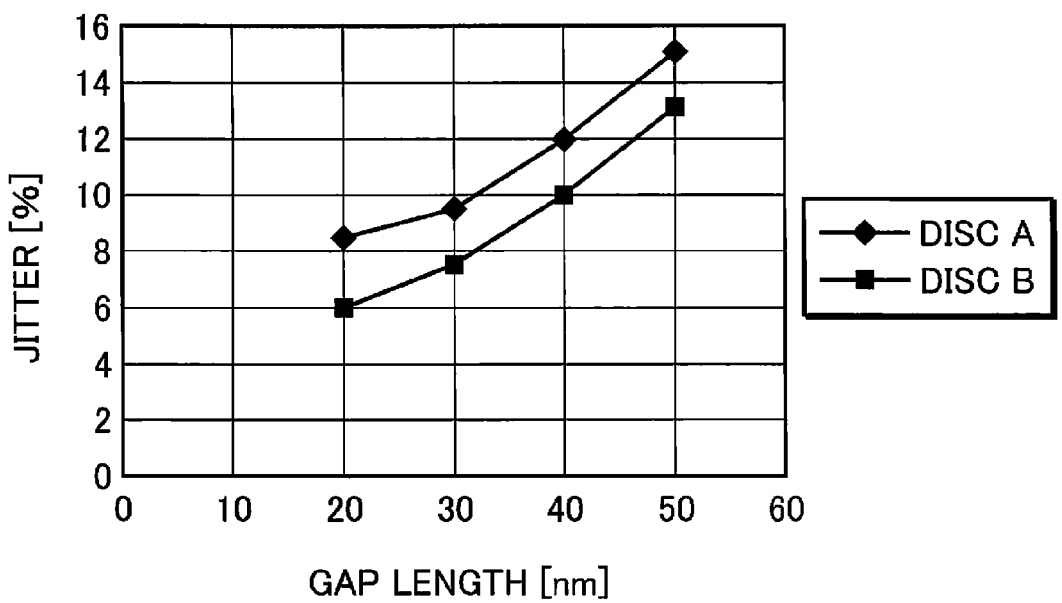
FIG. 6 is a graph showing relationships between the gap length and the jitter according to an example of the invention.

Relationships of the respective discs A and B between the gap length and the jitter are shown in FIG. 6. A better jitter was obtained for the disc B than for the disc A even at the same gap length. The gap length corresponding to the threshold Jth of 10% of the jitter was 32 nm for the disc A and 40 nm for the disc B.

Subsequently, the gap lengths were set at 32 nm and 40 nm for the respective discs, reproduction from the tracks from 30 mm to 35 mm in radius was repeatedly performed 10000 times and the number of crashes was measured. This measurement result is shown in Table-2.

TABLE 2

| Gap Length | Disc A | Disc B |
|---|---|---|
| 32 nm | 6 | 8 |
| 40 nm | 2 | 1 |

It was found from the result of Table-2 that, for either disc, the shorter the set gap length, the higher the probability of a crash.

From this, it was found that an effect of minimizing the probability of a crash in a range in which the jitter satisfied a permissible value could be obtained by setting the gap length at 32 nm for the disc A and at 40 nm for the disc B.

If the method for setting the gap length at a constant value without considering the individual difference of discs is employed as before, such an effect cannot be displayed. This is because the probability of a crash cannot be minimized for the disc B when the gap length is set at a constant value of 32 nm and the jitter is beyond the permissible range for the disc A when the gap length is set at a constant value of 40 nm.

Although the optical discs 1 in which the thin film layers were laminated on the substrate were used in the above example, a protection layer may be provided on the thin film layers.

The above recording conditions, reproducing conditions and the like are not limited to those illustrated in the above example, and suitable conditions can be set according to characteristics of the device and the medium.

Although a phase-change material was used as a recording material of the rewritable optical information recording medium in the above example, the recording material is not limited to this and any material such as a recordable dye material and a magneto-optical material can be used provided that a recording mark can be formed on a medium. Further, in the case of the read-only type, any material can be used provided that a recording mark can be formed on a medium.

Further, effects similar to the above ones can also be obtained in personal computers, servers, recorders, semiconductor devices using the above optical information reproducing method and optical information reproducing device.

The present invention is summarized as follows based on the above embodiment. Specifically, an optical disc device according to the present invention is an optical information reproducing device for reproducing information from an optical information recording medium and includes a light focusing unit for generating near-field light; a measuring unit for measuring reproduction signal quality of the optical information recording medium using the near-field light generated by the light focusing unit; a gap length determining unit for determining a gap length between the light focusing unit and a surface of the optical information recording medium as a set value based on a measurement result on the reproduction signal quality in the measuring unit; and a gap control unit for controlling a gap between the light focusing unit and the surface of the optical information recording medium based on the set value determined in the gap length determining unit.

According to this device, the reproduction signal quality can be improved while the probability of a crash is reduced since an optimal gap length can be set for an individual optical information recording medium. That is, it becomes possible to reduce a possibility of damaging the optical information recording medium due to a crash of the light focusing unit and accurately reproduce information by improving the reproduction signal quality.

Preferably, the above optical information reproducing device further includes a detecting unit for optically detecting the gap length between the light focusing unit and the surface of the optical information recording medium and outputting a detection signal, and the gap control unit controls the gap using the detection signal.

In this case, the gap length can be easily detected since the gap control unit controls the gap using the detection signal based on an optical means.

The measuring unit preferably measures the reproduction signal quality at least at two different gap lengths.

In this case, an optimal gap length can be easily determined since the measuring unit for performing test reproduction measures the reproduction signal quality at least at two different gap lengths.

The above optical information reproducing device preferably further includes a reproduction stopping unit for stopping reproduction from the optical information recording medium when a measurement value of the reproduction signal quality measured by the measuring unit does not satisfy a predetermined quality condition even if the gap length between the light focusing unit and the surface of the optical information recording medium is shortened to a predetermined length.

In this case, the reproduction from the optical information recording medium is stopped, for example, when the measurement value of the reproduction signal quality exceeds the predetermined value even if the gap length is shortened to the predetermined length. This can prevent the optical information recording medium from being damaged by a crash.

Preferably, the gap length determining unit determines a gap length, at which the gap length and the measurement value of the reproduction signal quality are in a predetermined relationship, as the set value, or determines a maximum gap length, at which the measurement value of the reproduction signal quality is a predetermined value, as the set value or determines a gap length, at which a slope of a tangent to a characteristic curve representing a relationship between the gap length and the measurement value of the reproduction signal quality is a predetermined value, as the set value. In any of these cases, an optimal gap length can be easily determined.

Preferably, the optical information recording medium is a medium capable of recording or rewriting information, the optical information reproducing device further includes a test recording unit for recording a test signal on the optical information recording medium with predetermined recording power and recording strategy, and the measuring unit measures the reproduction signal quality by reproducing the test signal from the optical information recording medium.

In this case, an optimal gap length can be set according to recording characteristics of an individual optical information recording medium.

The optical information reproducing device preferably further includes a recording power setting unit for setting the recording power at a target value after the gap control unit controls the gap.

In this case, the recording power can be accurately determined since it is set at the target value after the gap control unit controls the gap.

The optical information reproducing device preferably further includes a recording strategy setting unit for setting the recording strategy at a target value after the gap control unit controls the gap.

In this case, the recording strategy can be accurately determined since it is set at the target value after the gap control unit controls the gap.

An optical information reproducing method according to the present invention is an optical information reproducing method for reproducing information from an optical information recording medium and includes a test reproducing step of measuring reproduction signal quality of the optical information recording medium using near-field light generated by a light focusing unit; a gap length determining step of determining a gap length between the light focusing unit and a surface of the optical information recording medium as a set value based on a measurement result on the reproduction signal quality in the test reproducing step; and a gap controlling step of controlling a gap between the light focusing unit and the surface of the optical information recording medium based on the set value determined in the gap length determining step.

According to this method, the reproduction signal quality can be improved while the probability of a crash is reduced since an optimal gap length can be set for an individual optical information recording medium.

Preferably, the gap is controlled using a detection signal indicating an optically detected gap length between the light focusing unit and the surface of the optical information recording medium in the gap controlling step.

In this case, the gap length can be easily detected since the gap is controlled using the detection signal based on an optical means.

Preferably, the test reproducing step includes a step of measuring the reproduction signal quality at least at two different gap lengths.

In this case, an optimal gap length can be easily determined since the reproduction signal quality is measured at least at two different gap lengths in the test reproducing step.

The above optical information reproducing method preferably further includes a reproduction stopping step of stopping reproduction from the optical information recording medium when a measurement value of the reproduction signal quality measured in the test reproducing step does not satisfy a predetermined quality condition even if the gap length between the light focusing unit and the surface of the optical information recording medium is shortened to a predetermined length.

In this case, the reproduction from the optical information recording medium is stopped, for example, when the measurement value of the reproduction signal quality exceeds the predetermined value even if the gap length is shortened to the predetermined length. This can prevent the optical information recording medium from being damaged by a crash.

Preferably, the gap length determining step includes a step of determining a gap length, at which the gap length and the measurement value of the reproduction signal quality are in a predetermined relationship, as the set value, or includes a step of determining a maximum gap length, at which the measurement value of the reproduction signal quality is a predetermined value, as the set value or includes a step of determining a gap length, at which a slope of a tangent to a characteristic curve representing a relationship between the gap length and the measurement value of the reproduction signal quality is a predetermined value, as the set value. In any of these cases, an optimal gap length can be easily determined.

Preferably, the optical information recording medium is a medium capable of recording or rewriting information, the optical information reproducing method further includes a test recording step of recording a test signal on the optical information recording medium with predetermined recording power and recording strategy, and the test reproducing step includes a step of measuring the reproduction signal quality by reproducing the test signal from the optical information recording medium.

In this case, an optimal gap length can be set according to recording characteristics of an individual optical information recording medium.

The optical information reproducing method preferably further includes a recording power determining step of setting the recording power at a target value after the gap is controlled in the gap controlling step.

In this case, the recording power can be accurately determined since it is set at the target value after the gap is controlled in the gap controlling step.

The optical information reproducing method preferably further includes a recording strategy determining step of setting the recording strategy at a target value after the gap is controlled in the gap controlling step.

In this case, the recording strategy can be accurately determined since it is set at the target value after the gap is controlled in the gap controlling step.

An integrated circuit according to the present invention is an integrated circuit used in an optical information reproducing device including a light focusing unit for generating near-field light and reproducing information from an optical information recording medium and includes a measuring circuit for measuring reproduction signal quality of the optical information recording medium using the near-field light generated by the light focusing unit; a gap length determining circuit for determining a gap length between the light focusing unit and a surface of the optical information recording medium as a set value based on a measurement result on the reproduction signal quality in the measuring circuit; and a gap control circuit for controlling a gap between the light focusing unit and the surface of the optical information recording medium based on the set value determined in the gap length determining circuit.

According to this integrated circuit, it is possible to realize an optical information reproducing device capable of improving reproduction signal quality while reducing the probability of a crash since an optimal gap length can be set for an individual optical information recording medium.

An optical information reproducing method and an optical information reproducing device according to the present invention can reduce the possibility of a damage due to a crash of a light focusing unit with a surface of an optical information recording medium and enable accurate information reproduction by improving reproduction signal quality. Therefore, they are useful as those relating to a control of a reproducing device using near-field light.

What is claimed is:

1. An optical information reproducing device for reproducing information from an optical information recording medium, comprising:
a light focusing unit for generating near-field light;
a measuring unit for measuring a reproduction signal quality of the optical information recording medium using the near-field light generated by the light focusing unit;
a gap length determining unit for determining a gap length between the light focusing unit and a surface of the optical information recording medium as a set value based on a measurement result on the reproduction signal quality in the measuring unit;
a gap control unit for controlling a gap between the light focusing unit and the surface of the optical information recording medium based on the set value determined in the gap length determining unit; and
a reproduction stopping unit for stopping reproduction from the optical information recording medium when a measurement value of the reproduction signal quality measured by the measuring unit does not satisfy a predetermined quality condition even if the gap length between the light focusing unit and the surface of the optical information recording medium is shortened to a predetermined length.

2. An optical information reproducing device according to claim 1, further comprising a detecting unit for optically detecting the gap length between the light focusing unit and the surface of the optical information recording medium and outputting a detection signal,
wherein the gap control unit controls the gap using the detection signal.

3. An optical information reproducing device according to claim 1, wherein the measuring unit measures the reproduction signal quality at least at two different gap lengths.

4. An optical information reproducing device according to claim 1, wherein the gap length determining unit determines a gap length, at which the gap length and the measurement value of the reproduction signal quality are in a predetermined relationship, as the set value.

5. An optical information reproducing device according to claim 4, wherein the gap length determining unit determines a maximum gap length, at which the measurement value of the reproduction signal quality is a predetermined value, as the set value.

6. An optical information reproducing device for reproducing information from an optical information recording medium, comprising:
a light focusing unit for generating near-field light;
a measuring unit for measuring are reproduction signal quality of the optical information recording medium using the near-field light generated by the light focusing unit;
a gap length determining unit for determining a gap length between the light focusing unit and a surface of the optical information recording medium as a set value based on a measurement result on the reproduction signal quality in the measuring unit; and
a gap control unit for controlling a gap between the light focusing unit and the surface of the optical information recording medium based on the set value determined in the gap length determining unit,
wherein the gap length determining unit determines a gap length, at which a slope of a tangent to a characteristic curve representing a relationship between the gap length and the measurement value of the reproduction signal quality is a predetermined value, as the set value.

7. An optical information reproducing device according to claim 1, wherein:
the optical information recording medium is a medium capable of recording or rewriting information;
the optical information reproducing device further comprises a test recording unit for recording a test signal on the optical information recording medium with predetermined recording power and recording strategy; and
the measuring unit measures the reproduction signal quality by reproducing the test signal from the optical information recording medium.

8. An optical information reproducing device according to claim 7, further comprising a recording power setting unit for setting the recording power at a target value after the gap control unit controls the gap.

9. An optical information reproducing device according to claim 7, further comprising a recording strategy setting unit for setting the recording strategy at a target value after the gap control unit controls the gap.

10. An optical information reproducing method for reproducing information from an optical information recording medium, comprising:
a test reproducing step of measuring a reproduction signal quality of the optical information recording medium using near-field light generated by a light focusing unit;
a gap length determining step of determining a gap length between the light focusing unit and a surface of the optical information recording medium as a set value based on a measurement result on the reproduction signal quality in the test reproducing step;
a gap controlling step of controlling a gap between the light focusing unit and the surface of the optical information recording medium based on the set value determined in the gap length determining step; and
a reproduction stopping step of stopping reproduction from the optical information recording medium when a measurement value of the reproduction signal quality measured in the test reproducing step does not satisfy a predetermined quality condition even if the gap length between the light focusing unit and the surface of the optical information recording medium is shortened to a predetermined length.

11. An integrated circuit used in an optical information reproducing device including a light focusing unit for generating near-field light and reproducing information from an optical information recording medium, comprising:
a measuring circuit for measuring a reproduction signal quality of the optical information recording medium using the near-field light generated by the light focusing unit;
a gap length determining circuit for determining a gap length between the light focusing unit and a surface of the optical information recording medium as a set value based on a measurement result on the reproduction signal quality in the measuring circuit;
a gap control circuit for controlling a gap between the light focusing unit and the surface of the optical information recording medium based on the set value determined in the gap length determining circuit; and
a reproduction stopping circuit for stopping reproduction from the optical information recording medium when a measurement value of the reproduction signal quality measured by the measuring circuit does not satisfy a predetermined quality condition even if the gap length between the light focusing unit and the surface of the optical information recording medium is shortened to a predetermined length.

* * * * *